United States Patent [19]

DeHaven

[11] 4,299,64

[45] Nov. 10, 19!

[54] TIRE RETREADING APPARATUS

[75] Inventor: William M. DeHaven, Randolph County, N.C.

[73] Assignee: Harrelson Rubber Company, Asheboro, N.C.

[21] Appl. No.: 134,027

[22] Filed: Mar. 26, 1980

[51] Int. Cl.³ .......................................... B29H 17/36
[52] U.S. Cl. .......................... 156/394 FM; 156/96; 425/17
[58] Field of Search ............ 156/96, 126, 127, 128 R, 156/129, 394 R, 394 FM; 425/17, 22

[56] References Cited

U.S. PATENT DOCUMENTS

| | | | |
|---|---|---|---|
| 2,989,779 | 6/1961 | White | 156/96 |
| 3,802,978 | 4/1974 | Barnett | 156/128 |
| 3,846,201 | 11/1974 | Huskins | 156/96 |
| 4,092,203 | 5/1978 | Harrelson | 156/129 |
| 4,123,306 | 10/1978 | Landry | 156/96 |
| 4,153,497 | 5/1979 | Budrioli | 156/96 |

*Primary Examiner*—John E. Kittle
*Attorney, Agent, or Firm*—Joseph H. Heard

[57] ABSTRACT

Annular envelope-sealing members are permanen affixed to and carried by the rim means upon which envelope-enshrouded tire is mounted preparatory to treatment within a heated pressure chamber. Mounti of the tire upon the rim means automatically brings t annular members into axial alignment with the tire a into overlying relationship with its opposite sidewal Each annular member is independently mounted f axial movement away from the rim means and is bias toward it so as impose a sealing force of desired nc excessive magnitude upon the tire, upon inflati thereof, notwithstanding possible variations in its sic wall width dimensions. The annular members may be constructed as to effect sealed relationships with respe tive ones of the marginal edge portions of the envelo upon the tire in either of two alternative ways, at t option of each particular retreader. One or more exte der sections may be positioned between and interlock with the flanged end sections of the rim means, to p( mit use of the apparatus in association with tires virtually any width.

12 Claims, 3 Drawing Figures

TIRE RETREADING APPARATUS

BACKGROUND OF THE INVENTION

This invention relates to "moldless" tire retreading of the type where, in preparation for treatment within a heated pressure chamber, a rim-mounted tire having a replacement tread strip thereon is partially enclosed by a flexible impervious envelope having marginal edge portions that overlie opposite sidewalls of the tire and are sealingly engaged by respective ones of a pair of annular envelope-sealing members. The invention more specifically relates to an improved retreading apparatus by which the envelope-sealing members may be more efficiently, safely and precisely positioned and secured in association with tires of varying widths.

DESCRIPTION OF THE PRIOR ART

The tire retreading apparatus of U.S. Pat. No. 3,802,978 includes annular envelope-sealing members whose radially outer portions overlie the sidewalls of a tire and have grooves therein which receive marginal edge portions of the flexible envelope upon such tire. The radially inner portions of the annular members are positioned between the bead areas of the tire and the end flanges of the curing rim upon which the tire is mounted. Assembly of the various discrete components of the apparatus in association with a tire requires appreciable time and skill. Additionally, the magnitudes of the forces produced between each of the annular members and a tire, upon inflation of the latter to the desired "curing" pressure, depend upon and vary in accordance with the particular width dimensions of such tire. Such forces and the resulting stresses may be of such excessive magnitude, when the apparatus is used in association with a tire having a large sidewall width dimension, as to damage the tire and/or one or more of the apparatus components.

The retreading apparatus of commonly-assigned U.S. Pat. No. 4,092,203 employs annular envelope-sealing members that overlie the envelope marginal edge portions upon the opposite sidewalls of a tire undergoing retreading, and that are releasably connected to each other by a shaft extending freely through the curing rim upon which the tire is mounted. Assembly of the various discrete components of this apparatus also requires a significant amount of time and skill and, if improperly done, can result in the annular members not being accurately centered and/or in excessive stresses being produced when the tire is inflated to the desired curing pressure.

SUMMARY OF THE INVENTION

The apparatus of the present invention includes curing rim means, of a sectional type readily insertable into the center opening of a tire to be retreaded, and a pair of annular envelope-securing members that are permanently carried by the rim means and extend radially outwardly from its opposite ends into overlying relationship with opposite sidewalls of the tire. The means by which the annular members are mounted in permanent association with the rim means maintains the foregoing components in precise axial alignment, while permitting independent axial movement of each of the annular members toward and away from the thereto-adjacent one of the end flanges of the rim means. Biasing means independently biases each annular member toward the adjacent rim flange, while permitting controlled axial movement thereof away from such rim flange in response to inflation and ensuing expansion of the tire. This insures that the forces between the radially outer portion of each annular member and the underlying one of the sidewalls of the tire will be of a sufficient but not excessive magnitude when the tire's width dimension is anywhere within a prescribed range.

The rim means of the apparatus includes a pair of generally cylindrical rim sections having cooperating interlocking means thereon and each having one of the rim flanges at its outer end. When the width of the tire mounted thereon is particularly large, the rim means further includes one or more extender sections disposed between and interlocked with the flanged rim sections.

In a preferred embodiment of the apparatus, the annular members are so constructed as to be capable of effecting sealing engagement with respective marginal edge portions of the envelope in two alternative ways either of which may be optionally employed by a particular tire retreader using the apparatus.

DESCRIPTION OF THE DRAWINGS

Other features and advantages of the invention will be apparent from the following description of a preferred embodiment thereof, which should be read in conjunction with the accompanying drawings, in which.

DESCRIPTION OF THE PREFERRED EMBODIMENT

Figure 1:
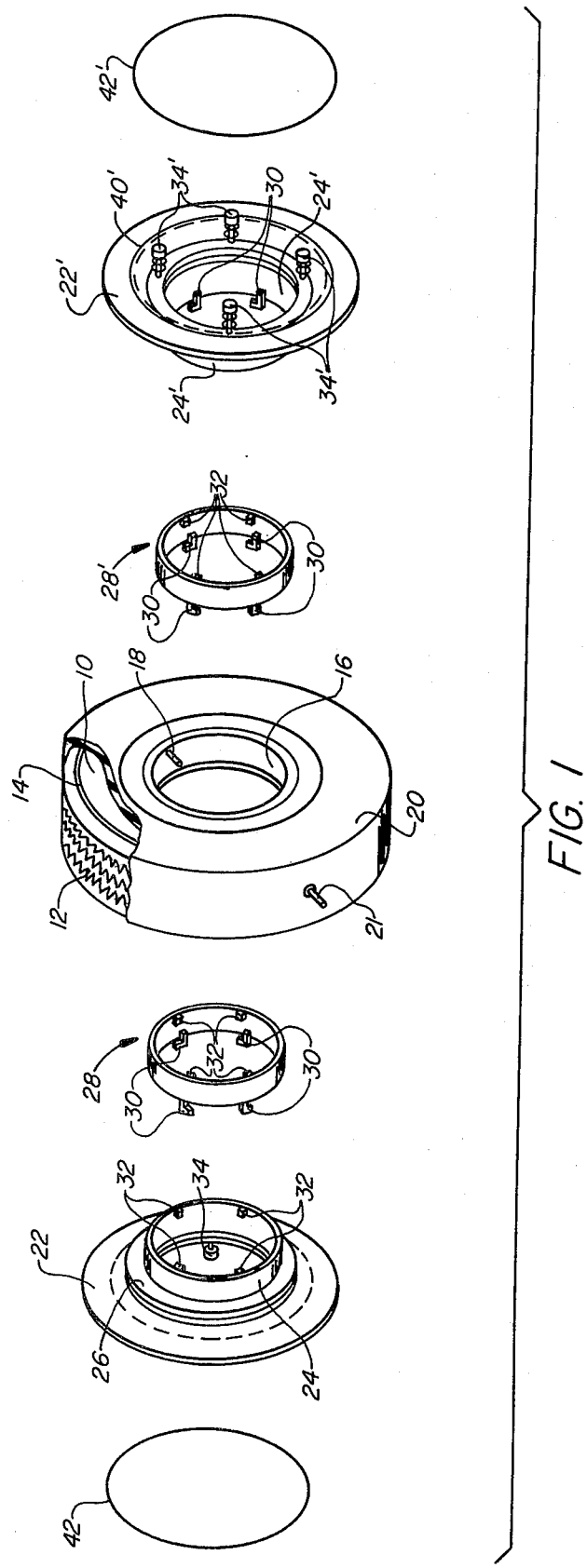
FIG. 1 is an exploded perspective view of tire retreading apparatus in accordance with the invention and of a tire, having a replacement tread strip and a flexible envelope thereon, in association with which selected ones of the illustrated apparatus components are usable.
Figure 2:
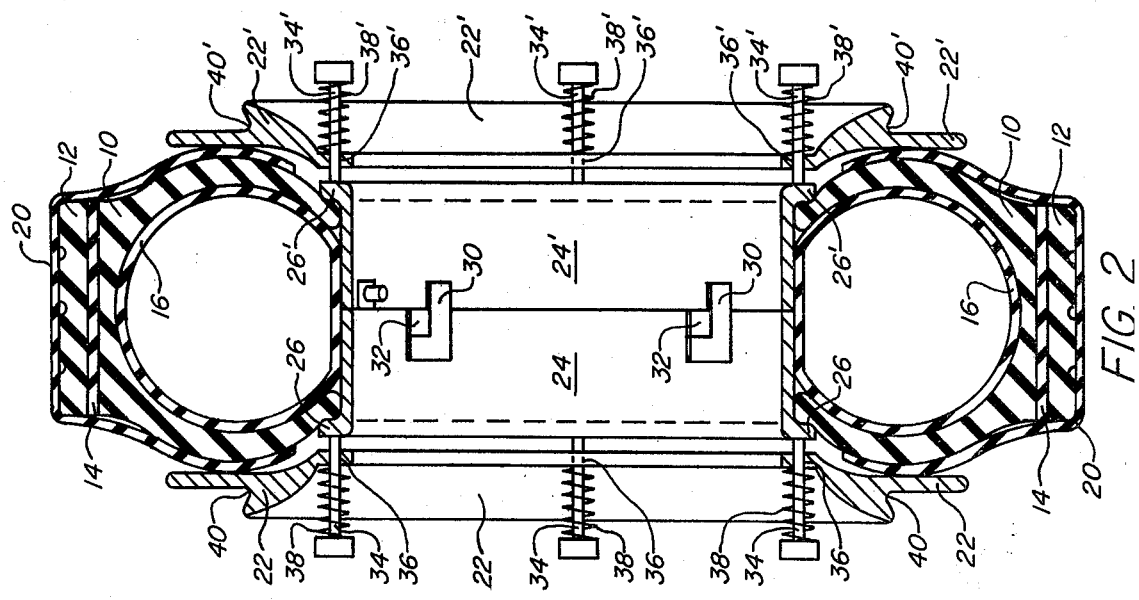
FIG. 2 is an enlarged sectional view showing the envelope-enshrouded tire and some of the apparatus components of FIG. 1 in assembled association.

In FIGS. 1 and 2 of the drawings the numeral 10 designates a tire encircled by a replacement tread strip 12 that is adapted to be permanently bonded to the tire either directly or by an intervening layer of binder material 14, during treatment of the FIG. 2 assembly within a heated pressure chamber (not shown). An airbag 16 having a valve member 18 is disposed within tire 10 and the central portion of a flexible impervious envelope 20, having a vent-valve member 21, overlies the replacement tread strip 12 upon the tire. The opposite marginal edge portions of envelope 20 overlie respective ones of the opposite sidewalls of tire 10, but terminate short of the tire's center opening and adjacent bead areas. Conventional additional preparation of tire 10 for its chamber treatment includes the mounting of the tire upon a suitable rim and the "sealing" of envelope 20 so as to cause the same to form a fluid-tight enclosure, from which air and the like can be evacuated via vent-valve 21, about replacement tread strip 12 and at least the underlying peripheral portion of tire 10.

The illustrated apparatus used for the foregoing purposes includes tire-mounting rim means with which a pair of annular envelope-sealing members 22, 22' are permanently and non-removably associated. The aforesaid rim means is of a sectional type that includes a pair of cylindrical rim sections 24, 24' having integral radial flanges 26, 26' at their respective outer ends. The rim means further includes a plurality of optionally usable extender sections, such as those two designated in FIG. 1 by the numerals 28, 28', having the same diameter as rim sections 24, 24'. The extender sections are shorter than rim sections 24, 24' and at least some preferably have different lengths. Interlocking means are provided upon their interior surfaces for the purpose of releasably securing rim sections 24, 24'—and, when used, one or more of the extender sections—in axially aligned abutting relationship to each other. The interlocking means includes a plurality of hook-like members 30 spaced about the circumference of the interior surface of rim section 24' and projecting from the inner end thereof, and correspondingly spaced lug-like members 32 upon the interior surface of rim section 24. Each extender section 28, 28' has both hooks 30 and lugs 32 spaced about its interior surface. Assembly of the rim means in association with a tire 10 whose width dimensions are within a range not necessitating use of any of the extender sections 28, 28' is accomplished (see FIG. 2) simply by inserting rim sections 24, 24' into the center opening of the tire from opposite sides thereof, and then rotating one and/or the other of them sufficiently to bring the lugs 32 upon rim section 24 into captive engagement with the hooks 30 upon rim section 24'. Such assembly step is quickly and easily preformed while the airbag 16 within tire 10 is deflated. The same assembly procedure is employed when one or more of the extender sections 28, 28' is positioned between rim sections 24, 24', except that in such case the lugs 32 upon rim section 24 are captively engaged by the hooks 30 upon the abutting extender section and the hooks 30 upon rim section 24' captively engage the lugs 32 upon the extender section in end-abutting relationship therewith.

Annular envelope-sealing member 22 is carried by and permanently mounted in association with rim section 24 by a plurality of stud-like elements 34 (FIG. 2) rigidly affixed at equally spaced intervals to the end flange 26 of such rim section and projecting outwardly therefrom in parallel relationship to its central axis. Studs 34 project through respective ones of a plurality of aligned bores 36 provided within and spaced equally about the circumference of a radially inward portion of annular member 22 that overlies flange 26 of rim section 24. The relative diameters of studs 34 and bores 36 are such as to maintain annular member 22 concentric with the projected central axis of rim section 24 while permitting axial movement of member 22 toward and away from rim flange 26. Biasing means, in the form of a plurality of coil-type compression springs 38, resiliently bias member 22 toward rim flange 26. Springs 38 encircle respective associated ones of studs 34 and each extends between the radially inward portion of member 22 and an enlarged head or nut upon the outer end of the stud which it encircles. The springs are of a calibrated type effective to maintain a substantially constant biasing force upon annular member 22 even when compressed to an appreciable extent.

The diameter of annular member 22 is sufficiently great that its radially outward portion will overlie the sidewall of a tire in whose center opening member 24 is inserted, and can thus effect sealing engagement with an envelope marginal edge portion adjacent such sidewall. To permit such engagement to be effected in either of two ways, at the option of each particular retreader, the exterior surface of the radially outward portion of member 22 illustratively and preferably is provided with an encircling groove 40 adapted to receive a constrictive and flexible ring-like member 42 (FIG. 1) formed, for instance, of elastic rubber material.

The construction of the other annular member 22', and its biased mounting upon rim section 24', are identical to those described in connection with annular member 22, and the same reference numerals with the addition of a prime designation are employed in the drawings to identify corresponding components.

By simply inserting rim sections 24, 24' into the center opening of tire 10, and then rotating one or the other of such sections sufficiently to bring their hooks 30 and lugs 32 into interlocking engagement, as shown in FIG. 2, annular members 22, 22' are automatically brought into axial alignment with the tire and into overlying relationship with respective ones of the marginal edge portions of envelope 20 that overlie the tire's sidewalls. Since the foregoing is done while tire 10 is deflated, annular members 22, 22' may and normally would at such time be respectively maintained by springs 38, 38' in continued engagement with flanges 26, 26' of rim sections 24, 24'. Pressurized air is then introduced into airbag 16 through its valve member 18, which extends through a suitable opening provided therefor in one or the other of the rim sections, to inflate tire 10 to the desired curing pressure. Inflation of tire 10 brings its bead areas into firm engagement with rim flanges 26, 26', and expands its envelope-overlaid sidewalls firmly against the undersurfaces of the radially outward portions of annular members 22, 22'. The strength of springs 38, 38' is sufficiently great to insure that the forces imposed by members 22, 22' upon the respective envelope margins will produce fluid-tight sealed relationships between the envelope margins and the respective tire sidewalls overlaid thereby, but is insufficient to prevent members 22, 22' from undergoing controlled axial movement away from the respective rim sections 24, 24' as the tire is inflated and its sidewalls expand. Such movement compensates for variations over a considerable range in the sidewall width dimensions of different tires with which the FIG. 2 apparatus might be used, and thus prevents the stresses between each annular member 22, 22' and the adjacent tire sidewall from exceeding a safe magnitude beyond which damage might occur. The extent of the aforesaid compensating movement does not have to be, and may at times not be, the same for both members 22, 22'. If for instance only one of the sidewalls of the tire has raised indicia or the like thereon, the annular member 22 or 22' overlying such sidewall will undergo greater compensating movement than the other annular member.

Figure 3:
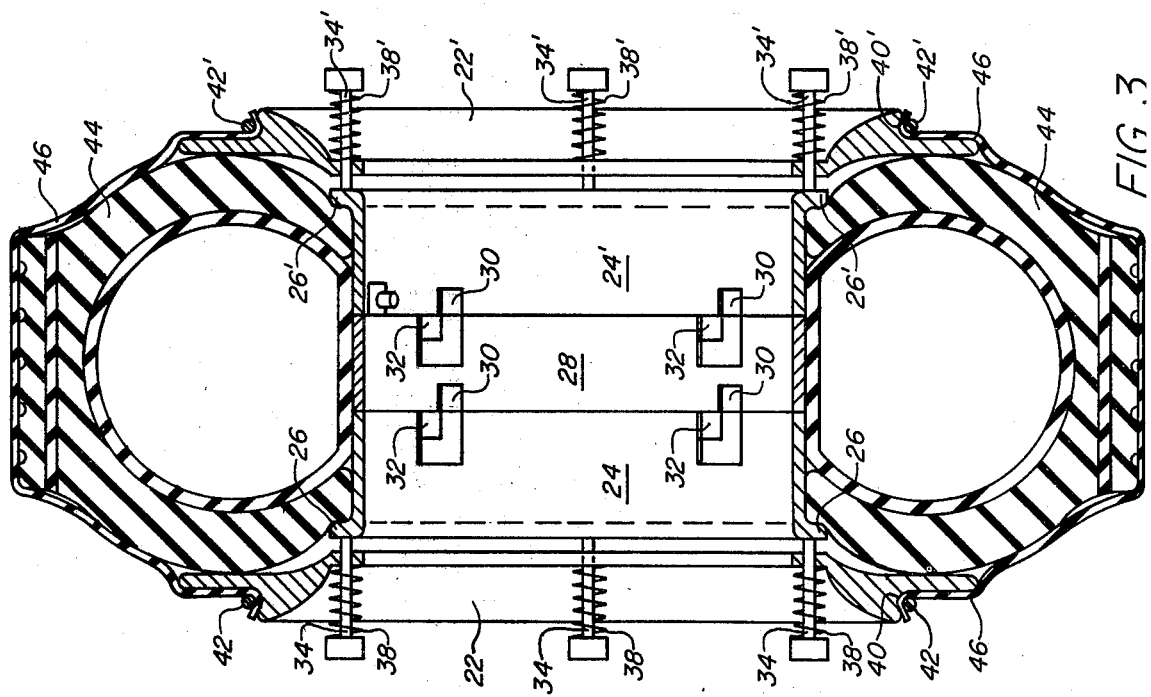
FIG. 3 is a view similar to FIG. 2 showing a larger envelope-enshrouded tire and additional apparatus components in assembled association.

The apparatus components shown in FIG. 2 may be successfully employed in association with tires whose sidewall width dimensions vary over a considerable range. With the addition of one or more of rim extender sections such as those shown in FIG. 1, the same components may be employed with equal facility and success in association with tires whose sidewall dimensions exceed the aforesaid range. FIG. 3 of the drawings, to which reference is now made, shows such a tire 44 and the use in association with it of the FIG. 2 apparatus components plus one extender section 28. Extender section 28 is disposed between flanged rim sections 24, 24', in end-abutting and axially-aligned relationship therewith. The hooks 30 and lugs 32 upon the interior cylindrical surface of extender section 28 interlock with the respective lugs 32 upon rim section 24 and hooks 30 upon rim section 24'. The inclusion of extender section 28 in the tire-mounting rim means permits annular members 22, 22' to undergo compensating axial movement, of the same nature and magnitude as that previously described, when the apparatus is used in association with tire 44 or in association with other tires whose width dimensions are even greater but are still within the effective compression range of springs 38, 38'. If the width of a particular tire should require the use of more than one extender section, the configuration of the apparatus would be the same as in FIG. 3 except that the confronting ends of the abutting extender sections would be directly interlocked with each other. Any required number of extender sections, of equal or varying lengths, can be employed.

FIG. 3 also illustrates the previously-noted alternative mode, which might be preferred by some tire retreaders, of effecting sealed engagement between annular members 22, 22' and the envelope 46 upon tire 44. Envelope 46 is placed upon tire 44 after, rather than prior to, mounting of the tire upon the rim means. The envelope's opposite marginal edge portions therefore overlie not only opposite sidewalls of tire 44, but also the radially outer portions of respective ones of the annular members 22, 22'. The elastic rings 42, 42' shown in FIG. 1 are then placed over respective ones of the envelope margins and within respective ones of the grooves 40, 40' of members 22, 22'. Contraction of the rings effects fluid-tight sealed relationships between the envelope marginal portions and the respective annular members, while the biasing forces imposed by springs 38, 38' upon members 22, 22' effect fluid-tight sealed relationships between the such members and the opposite tire sidewalls overlaid and directly engaged thereby.

While a specific embodiment of the invention has been shown and described, this was for purposes of illustration only, and not for purposes of limitation, the scope of the invention being in accordance with the hereinafter presented claims.

That which is claimed is:

1. Tire retreading apparatus for use in the moldless chamber-treatment retreading of a tire encircled by a replacement tread strip and by the overlying medial portion of a flexible envelope having opposite marginal edge portions overlying and adapted to be sealingly secured adjacent opposite sidewalls of said tire carcass; said apparatus comprising:
   generally cylindrical rim means for mounting said tire, said rim means extending through and coaxially of the center opening of said tire and having radially projecting flanges at its opposite ends overlying the bead areas of said tire;
   a pair of annular envelope-sealing members each having a radially inward portion overlying a respective one of said flanges of said rim means, and each having a radially outward portion overlying a respective one of said opposite sidewalls of said tire and sealingly engaging the there-disposed one of said envelope marginal edge portions;
   mounting means mounting said annular members upon and in permanent axially aligned relationship with said rim means for independent axial movement of each of said members toward and away from the adjacent one of said flanges of said rim means;
   and resilient biasing means associated with said mounting means for independently biasing each of said annular members axially inwardly toward t[he] thereto adjacent one of said flanges of said ri[m] means and toward the thereto adjacent one of sa[id] sidewalls of said tire, while permitting constrain[ed] movement of each of said annular members axial[ly] outwardly to compensate for variations in the sid[e] wall width dimensions of said tire.

2. Apparatus as in claim 1, wherein each of said ann[u]lar members has a plurality of circumferentially spac[ed] bores within said radially inwardly portion thereof; a[nd] wherein said mounting means includes a plurality [of] stud-like elements affixed to and projecting outward[ly] from each of said rim flanges; said stud-like elemen[ts] upon one of said flanges extending through said bores [of] the overlying one of said annular members, and sa[id] stud-like elements upon the other of said flanges exten[d]ing through said bores of the other of said annular me[m]bers.

3. Apparatus as in claim 2, wherein said biasing mea[ns] includes a plurality of compression springs each carri[ed] by and encircling a respective associated one of sa[id] stud-like elements.

4. Apparatus as in claim 3, wherein each one of sa[id] stud-like elements has a head upon its outer end, and t[he] stud-encircling one of said springs projects between sa[id] head and the one of said annular members throu[gh] which said one of said stud-like elements extends.

5. Apparatus as in claim 4, wherein said rim mea[ns] includes a pair of generally cylindrical rim sectio[ns] insertable into said center opening of said tire fro[m] opposite sides thereof and having said rim flanges [at] their respective outer ends; and interlocking mea[ns] upon the interior surfaces of said rim sections for relea[s]ably securing said rim sections in axial alignment wi[th] each other.

6. Apparatus as in claim 5, wherein said rim mea[ns] further includes at least one generally cylindrical exte[n]der section positionable between and in axial alignme[nt] with said first mentioned rim sections for increasing t[he] overall length of said rim means; said extender secti[on] having interlocking means upon its interior surfa[ce] cooperable with said interlocking means upon said fir[st] mentioned rim sections.

7. Apparatus as in claim 5, wherein said rim mea[ns] further includes a plurality of generally cylindrical e[x]tender sections each positionable between and in ax[ial] alignment with said first-mentioned rim sections, a[nd] each having interlocking means upon its interior surfa[ce] cooperable with said interlocking means upon t[he] other of said sections of said rim means.

8. Apparatus as in claim 7, wherein said interlocki[ng] means includes a plurality of circumferentially spac[ed] hook-like members upon at least one of said sections [of] said rim means, and a plurality of corresponding[ly] spaced lug-like elements upon another of said sectio[ns] of said rim means.

9. Apparatus as in claim 1, wherein said rim mea[ns] includes a pair of generally cylindrical rim sectio[ns] insertable into said center opening of said tire fro[m] opposite sides thereof and having said rim flanges [at] their respective outer ends; a generally cylindrical e[x]tender section disposed between and in end-abutti[ng] axially-aligned relationship with said flanged rim se[c]tions; and interlocking means upon the interior surfac[es] of said sections for releasably securing said sectio[ns] together.

10. Apparatus as in claim 9, wherein respective on[es] of said annular members are independently and perm[anently]

ntly mounted by said mounting means in association with respective ones of said flanged sections of said rim means.

11. Apparatus as in claim 10, wherein said radially ter portion of each of said annular members has an velope-sealing inner surface adapted to engage one of d envelope marginal edge portions when the same derlies said annular member, and has an envelope-sealing groove therein adapted to receive said envelope marginal edge portion when the same overlies said annular member.

12. Apparatus as in claim 11, and further including a pair of constrictive ring-like members each adapted to also be received within said groove of a corresponding one of said annular members.

* * * * *